United States Patent
Shibata et al.

[11] 3,842,778
[45] Oct. 22, 1974

[54] PARACHUTE EQUIPMENT

[75] Inventors: Jitsu Shibata; Naohumi Murao; Haruhiko Mishina; Keiichi Nakayama, all of Nagasaki, Japan

[73] Assignee: Mitsubishi Jukogyo Kabushiki Kaisha, Tokyo, Japan

[22] Filed: Apr. 16, 1973

[21] Appl. No.: 351,616

[52] U.S. Cl............... 114/209, 242/83, 244/110 D, 244/147
[51] Int. Cl.......................................... B63b 21/48
[58] Field of Search ............ 114/209; 244/147, 148, 244/139, 110 C, 110 D, 113; 242/83, 84.2 B, 174

[56] References Cited
UNITED STATES PATENTS

| | | | |
|---|---|---|---|
| 1,758,170 | 5/1930 | Parker | 244/147 |
| 2,352,721 | 7/1944 | Krahel | 244/139 |
| 2,581,306 | 1/1952 | Slotterback | 242/84.2 B |
| 2,677,509 | 5/1954 | Goge | 242/84.2 B |
| 2,923,267 | 2/1960 | Jackson | 114/209 |
| 2,972,458 | 2/1961 | Sepp | 244/113 |

FOREIGN PATENTS OR APPLICATIONS
269,749  12/1966  U.S.S.R.

*Primary Examiner*—Trygve M. Blix
*Assistant Examiner*—Galen L. Barefoot
*Attorney, Agent, or Firm*—Cushman, Darby & Cushman

[57] ABSTRACT

A parachute equipment comprising a box body having formed therein a parachute storage compartment provided with an openable door and a cocoon-shaped parachute cable storage compartment, a parachute stored in the parachute storage compartment in a folded form to be ejected therefrom outboard as the door is opened, and a parachute cable stored in the parachute cable storage compartment in the form of a stack of turns each in the shape of numeral 8 along grooves formed in the inner wall of the compartment and having one end connected to the parachute and the other end to an anchor stud provided on the deck of a ship.

1 Claim, 4 Drawing Figures

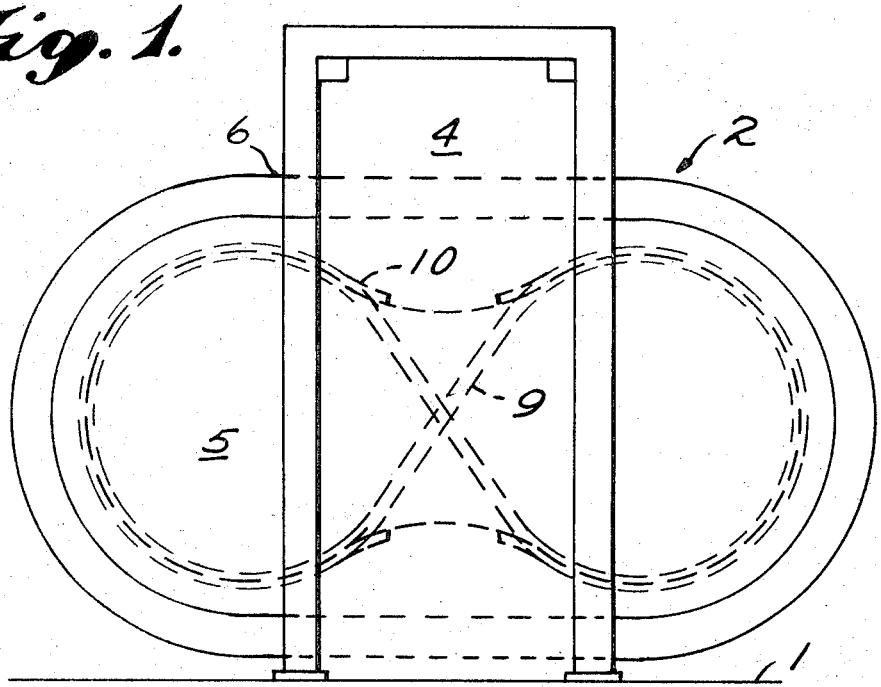
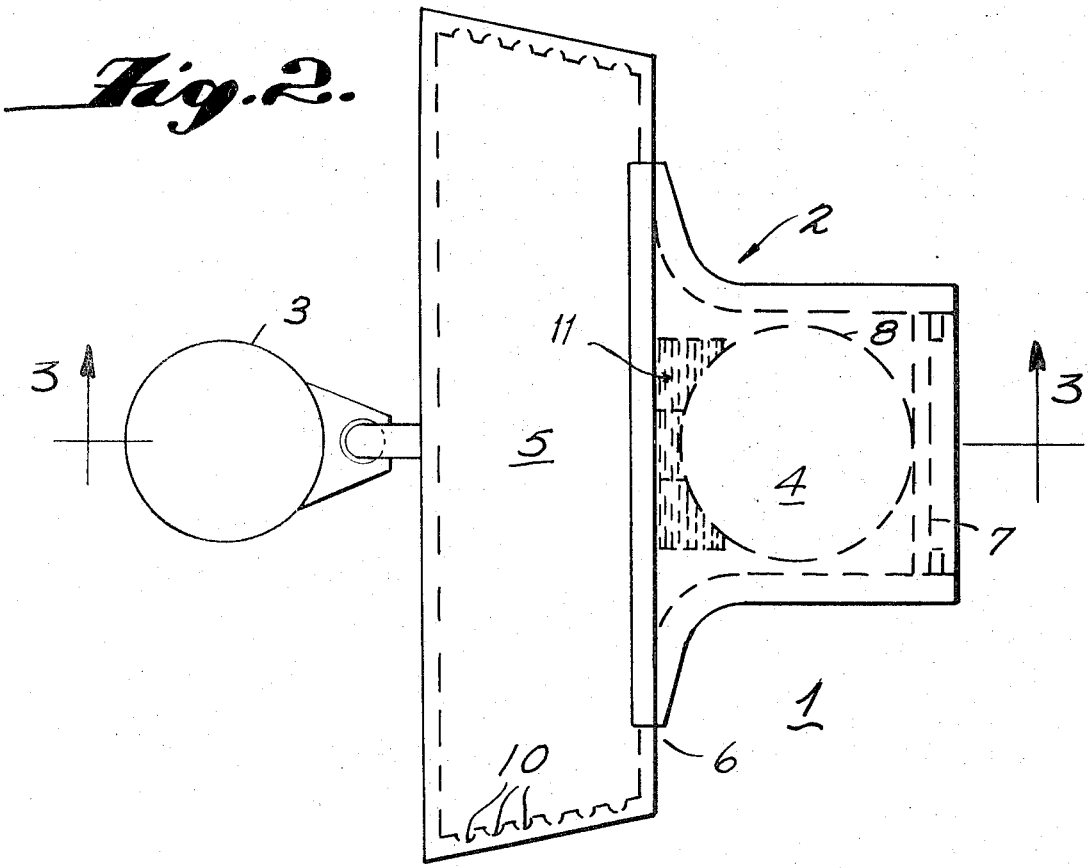

PARACHUTE EQUIPMENT

BACKGROUND OF THE INVENTION

1. Field of the Invention

This invention relates to a parachute equipment.

2. Description Of The Prior Art

A retrievable parachute equipment has been developed which is used for quickly bringing ships to a halt. This prior art parachute equipment, however, has the following disadvantages:

1. The construction of the equipment is so complicated that a parachute is ejected and serves as braking means for ships, only after a number a mechanisms are actuated sequentially satisfactorily. Thus, the equipment calls for constant maintenance and inspection.

2. Because of the large space requirement, the equipment occasionally interferes with the installation of loading and unloading facilities, mooring facilities, etc. on the deck.

3. Folding and storage of the parachute after use require a special skill which necessitates the training of the operator.

The above-described technical, economical and operational difficulties result most predominantly from the fact that the equipment is designed on the premise that the parachute is to be retrieved for reuse. There has been the idea since a long time ago that, should it be made a rule that the parachute is used solely in case of emergency and therefore very rarely, and the used parachute is discarded, a parachute equipment of simple construction and high reliability could be designed. However, such idea has not been promoted by reason of the facts that there has not been found a method of paying out a wire free of kink, that the effort for providing the equipment in a compact form has not met a successful result because a parachute container and wire storage means have been considered separately from each other, and that there has been a prevailing idea that it is simply a waste to discard the used parachute, because those skilled in the art have continued the use of fabric for the parachute.

The development of a retrievable parachute equipment has encountered an increasing difficulty as the testing and study proceeds, which has made the materialization of such equipment less prospective. On the other hand, no technical improvement has been made to overcome the poor steerability of huge ships and the necessity for quick braking of huge ships is not decreasing but rather increasing.

SUMMARY OF THE INVENTION

The object of the present invention is to provide a disposable parachute equipment.

According to the invention there is provided a parachute equipment comprising a box body having formed therein a parachute storage compartment provided with an openable door and a cocoon-shaped parachute cable storage compartment, a parachute stored in said parachute storage compartment in a folded form to be ejected therefrom outboard as said door is opened, and a parachute cable stored in said parachute cable storage compartment in the shape of numeral 8 along grooves formed in the inner wall of said compartment and having one end connected to said parachute and the other end to an anchor stud provided on the deck of a ship.

The parachute equipment of the invention is advantageous (1) in that kinking of the parachute cable can be avoided when the cable is paid out, as the cable is stored in the cocoon-shaped compartment in the shape of numeral 8, and the storage of the cable is easy if a mechanical force is used at a plant, although difficult by manual force, (2) in that a parachute container and a wire box which have heretofore been provided separately can be provided by a unitary compact box and the parachute once ejected can be discarded simply by providing release hook means between the box and the anchor stud to which said box is connected, (3) in that since the parachute container and wire box are put together integrally with each other as stated in (2) above, automatic remote control means for the equipment is required only to disengage latch means for the single door and the equipment can be actuated with high reliability, (4) in that the transportation of the equipment from a warehouse can be facilitated by providing wheels at the bottom of the equipment, and (5) is that the retrieval of the parachute after use, when desired by the user, can be achieved easily by previously providing the parachute with a retrieving cable and providing a portable winch on the deck which is supplied to the user together with the parachute equipment. The parachute equipment of the invention is highly adapted for use as emergency braking means for ships.

BRIEF DESCRIPTION OF THE DRAWINGS

FIG. 1 is a schematic illustrative front view of an embodiment of the parachute equipment according to the present invention;

FIG. 2 is a plan view of the parachute equipment shown in FIG. 1;

DESCRIPTION OF THE PREFERRED EMBODIMENT

Figure 3:
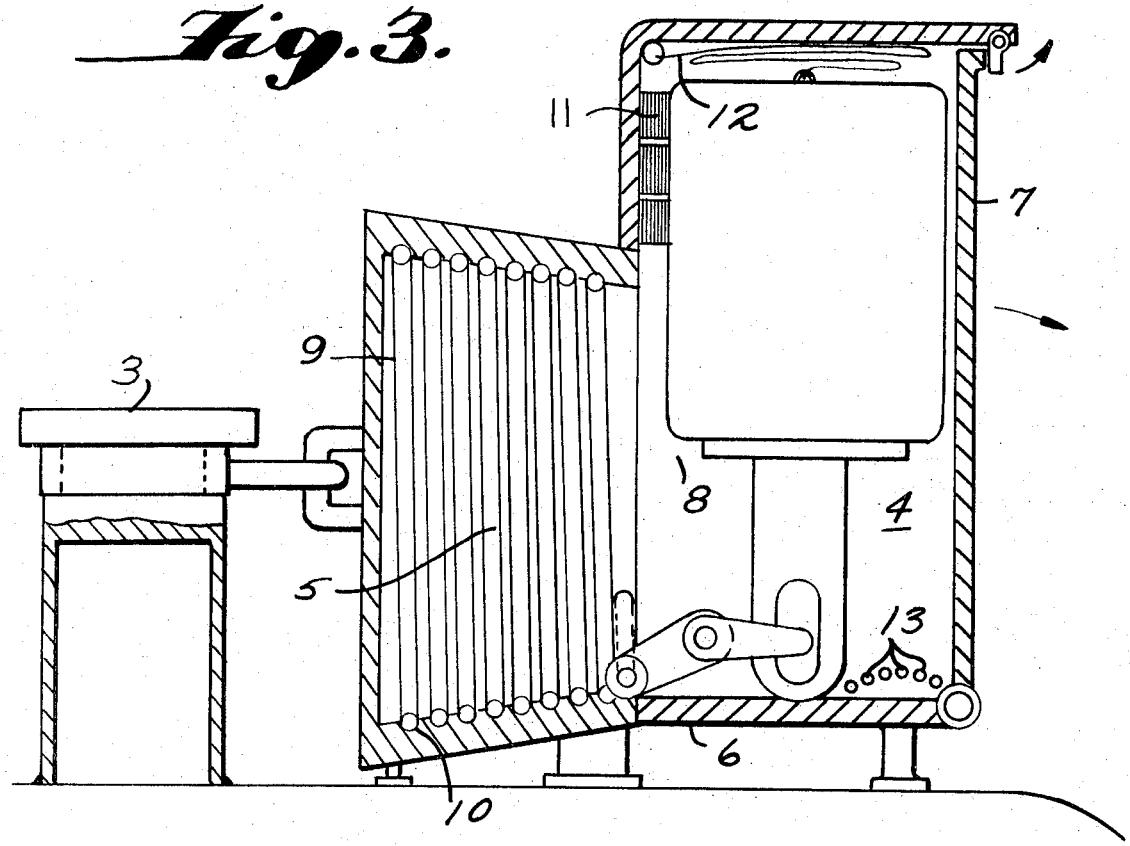
FIG. 3 is a sectional view taken along the line III—III of FIG. 2.

A preferred embodiment of the invention will be described hereunder with reference to the accompanying drawings. In the drawings, reference numeral 1 designates an upper deck of a ship, 2 a parachute equipment of the invention mounted on the upper deck 1 at a location adjacent the boardside, and 3 a parachute anchor stud provided on the upper deck 1. The parachute equipment 2 includes a box body 6 having therein a parachute storage compartment 4 and a parachute cable storage compartment 5, an openable door 7 provided on the front side of said box body 6, a parachute 8 stored in the folded form in the parachute storage compartment 4, and a parachute cable 9 stored in the shape of numeral 8 in the parachute cable storage compartment 5. The parachute cable storage compartment 5 is in the shape of cocoon for storing the parachute cable 9 therein in the shape of numeral 8, and has grooves 10 formed in the inner wall thereof for setting the parachute cable stably therein. The rear end of the parachute cable 9 stored in the compartment 5 is connected to the parachute cable anchor stud 3 through the intermediary of a rear wall of the storage compartment 5 and the front end thereof to the parachute 8. On the other hand, the folded parachute stored in the parachute storage compartment 4 is urged with a suitable force toward the door 7 by elastic packings 11 disposed between said parachute and the rear wall of said compartment 4, so that the parachute may be ejected outboard automatically when the door 7 is opened. Though not apparent in the drawings, an arrangement is made such that the door 7 may be opened by way of a compressed air system or any other suitable operating system under remote control from the bridge or any other desired location on the ship.

The parachute equipment of the invention is designed primarily with the intention that the parachute is discarded after use. However, when the parachute equipment has to be converted to a retrievable type at the request of the ship owner or other users, this can be achieved by connecting a retrieving cable 12 (of a length slightly larger than the length of the parachute cable) to the peak of the parachute at one end, with the other connected to the wall of the storage compartment 4. In this case, the parachute after use can be retrieved by winding the retrieving cable 12 on a winch or the like.

It is preferable to provide wheels at the bottom of the box body 6 for facilitating the transportation of the equipment on the deck, though not shown in the drawings.

Reference numeral 13 designates parachute cable guide rollers which are provided for minimizing the friction between the parachute cable and the box body when the cable is paid out and thereby for achieving smooth issue of the cable.

Now, the operation of the parachute equipment of the invention will be described.

a. Before the ship sails out, the box body 6 having the parachute and the parachute cable stored therein is set in a desired position on the deck and connected with the parachute anchor stud 3.

b. When the necessity has arisen to quickly bring the ship to a halt upon finding an obstacle on the course of the ship during voyage, the latch for the door 7 is disengaged under remote control from the bridge of the ship to open the door.

c. As the door 7 opens, the parachute 8 is automatically ejected outboard by the compressed air plus the biasing force of the elastic packings 11.

d. The parachute cable 9 stored in the storage compartment in the shape of numeral 8 is successively paid out forward as the parachute 8 drops.

e. When the parachute cable 9 has completely been paid out, the parachute 8 opens applying a braking force to the ship.

f. The parachute 8 after having served its purpose is discarded in the sea by severing the parachute cable 9 from the anchor stud 3. Where it is desired to retrieve the parachute, the parachute is retrieved onto the deck by winding the retrieving cable 12 on a winch or other suitable winding means.

g. After the parachute has been discarded, the used equipment is replaced entirely by a complete spare equipment including the box body 6, which is loaded on the ship before sailing.

Figure 4:
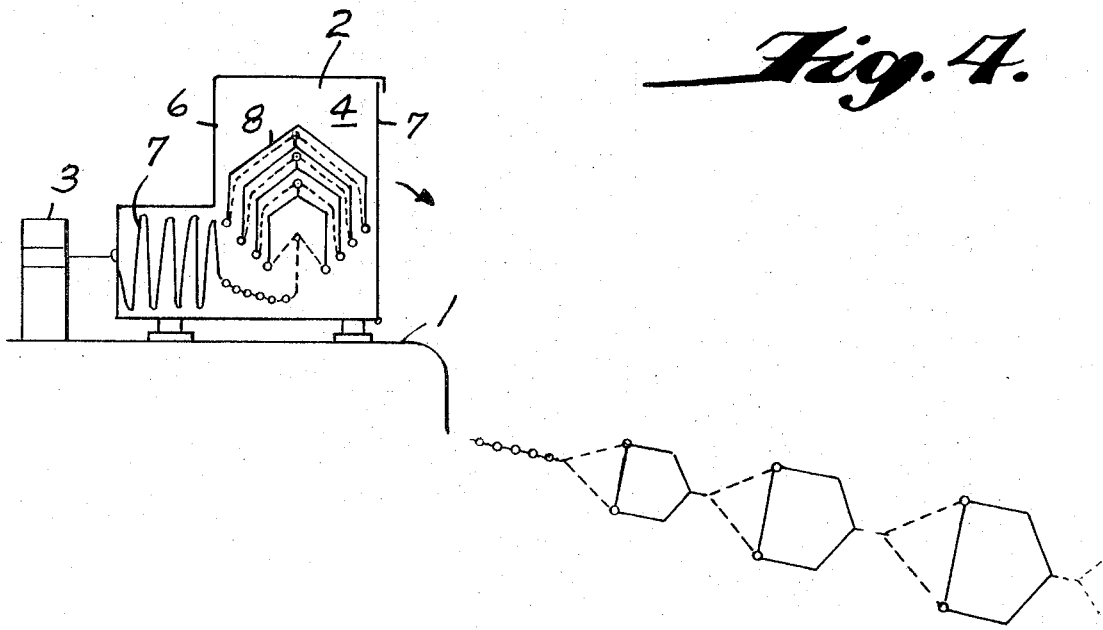
FIG. 4 is a schematic illustrative view of a multibucket type parachute.

If the parachute to be discarded is costly, it would be uneconomical to discard such parachute. In such a case, a steel-made multi-bucket type parachute as shown in FIG. 4 may be used, which is inexpensive relative to the fabric-made parachute and of economical advantage.

According to the construction of the parachute equipment of the invention, as described hereinbefore, the parachute cable 9 is stored in the cocoon-shaped storage compartment 5 in the form of a stack of turns each being in the shape of numeral 8 and retained in each of the grooves 10 formed in the inner wall of said storage compartment under its own stretching force. Therefore, there is no fear of the cable disintegrating in stored shape under oscillation of the ship or other conditions, and the cable can be paid out successively in an orderly manner without kinking when the parachute 8 is ejected. Thus, the parachute equipment is highly reliable in operation.

Further, since the parachute storage compartment and the parachute cable storage compartment are provided in the single unitary box body 6, the parachute equipment of the invention is very compact as a whole, which is advantageous in transportation of the equipment. The operation of the equipment is also simple as the ejection of the parachute can be achieved automatically, simply by opening the door 7.

It is also to be noted that according to the construction of the invention, the parachute and parachute cable can be stored in a completely sealed condition, so that the equipment is sufficiently durable with severe conditions on the deck, such as waves, winds and rains, even when it is exposed directly to such conditions over an extended period of time, and therefore, the labor heretofore required for the maintenance of this type of equipment can be drastically reduced.

We claim:

1. A parachute equipment comprising a box body having formed therein a parachute storage compartment provided with an openable door and a cocoon-shaped parachute cable storage compartment, a parachute stored in said parachute storage compartment in a folded form to be ejected therefrom outboard as said door is opened, and a parachute cable stored in said parachute cable storage compartment in the form of a stack of turns each in the shape of numeral 8 along grooves formed in the inner wall of said compartment and having one end connected to said parachute and the other end to an anchor stud provided on the deck of a ship.

* * * * *